United States Patent [19]

Araki et al.

[11] 4,339,702
[45] Jul. 13, 1982

[54] STEPPING MOTOR DRIVE APPARATUS

[75] Inventors: Shigeyuki Araki; Hideyasu Yamanaka, both of Tokyo, Japan

[73] Assignee: Ricoh Company, Ltd., Tokyo, Japan

[21] Appl. No.: 185,064

[22] Filed: Sep. 8, 1980

[30] Foreign Application Priority Data

Sep. 11, 1979 [JP] Japan ............................. 54-116307

[51] Int. Cl.³ ............................................ G05B 19/40
[52] U.S. Cl. ................................................. 318/696
[58] Field of Search ........................................ 318/696

[56] References Cited

U.S. PATENT DOCUMENTS 3,893,012  7/1975  Lin ...................................... 318/696
4,262,240  4/1981  Arai ...................................... 318/696

Primary Examiner—J. V. Truhe
Assistant Examiner—Eugene S. Indyk
Attorney, Agent, or Firm—David G. Alexander

[57] ABSTRACT

A stepping motor (31) drives a load (33) such as an ink ribbon in a printer which exerts reverse torque on the motor shaft (32) thus displacing the shaft (32) slightly in the reverse direction when a low hold current is applied to a motor phase. Prior to switching the motor (31) to a next phase for rotation, a high drive current is applied to the present phase. After a certain length of time which is sufficient for the shaft (32) to be moved to the correct present position, the phases are sequentially switched while the high drive current is applied for rotating the shaft (32) and load to a new position.

2 Claims, 8 Drawing Figures

STEPPING MOTOR DRIVE APPARATUS

BACKGROUND OF THE INVENTION

The present invention generally relates to a stepping motor drive apparatus which energizes a stepping motor with a high drive current for rotation and with a low hold current for holding the shaft in a present position. More particularly, the present invention is concerned with a drive system which permits a stepping motor of the type applied with reverse torque in a stop position to positively rotate in the forward direction to a new position.

Generally, a stepping motor is energized by a high drive current for rotation and with a low hold current in a stopped condition in order to avoid generation of heat and other undesired effects. A conventional stepping motor drive system drives a stepping motor from a stopped state with the hold current applied in the stop phase and then energizes the stepping motor with a drive current starting with the next phase.

This type of conventional design, however, cannot avoid displacement of the stop position of the stepping motor used as a film ribbon feed motor for example which is subjected to a torque tending to rotate the shaft in the reverse direction. The change of current from the larger drive current to the smaller hold current when the motor stops is accompanied by a reduction in the holding force causing the shaft to move in the reverse direction due to the reverse torque exerted by the film ribbon.

Where the displacement from the stop position in the reverse direction is substantial, the start-up torque for the next drive phase becomes smaller and prevents driving of the load.

SUMMARY OF THE INVENTION

A motor drive apparatus embodying the present invention comprises a multi phase motor having a shaft and drive means for sequentially energizing the motor phases with a high drive current for rotating the shaft and for energizing a present motor phase with a low hold current for holding the shaft in a respective present position, and is characterized in that, prior to energizing a next motor phase for rotating the shaft away from the present position, the drive means is constructed to energize the present phase with the high drive current for a predetermined length of time.

In accordance with the present invention, a stepping motor drives a load such as an ink ribbon in a printer which exerts reverse torque on the motor shaft thus displacing the shaft slightly in the reverse direction when a hold current is applied to a motor phase. Prior to switching the motor to a next phase for rotation, a high drive current is applied to the present phase. After a certain length of time which is sufficient for the shaft to be moved to the correct present position, the phases are sequentially switched while the high drive current is applied for rotating the shaft and load to a new position.

It is an object of the present invention to provide a stepping motor drive apparatus which ensures proper drive of the motor shaft and load from one position to another even though the load exerts a reverse torque on the motor shaft.

It is another object of the present invention to provide a generally improved stepping motor drive apparatus.

Other objects, together with the foregoing, are attained in the embodiment described in the following description and illustrated in the accompanying drawing.

DESCRIPTION OF THE PREFERRED EMBODIMENT

While the stepping motor drive apparatus of the present invention is susceptible of numerous physical embodiments, depending upon the environment and requirements of use, substantial numbers of the herein shown and described embodiment have been made, tested and used, and all have performed in an eminently satisfactory manner.

The present invention will now be described with reference to the accompanying drawings.

Figure 1:
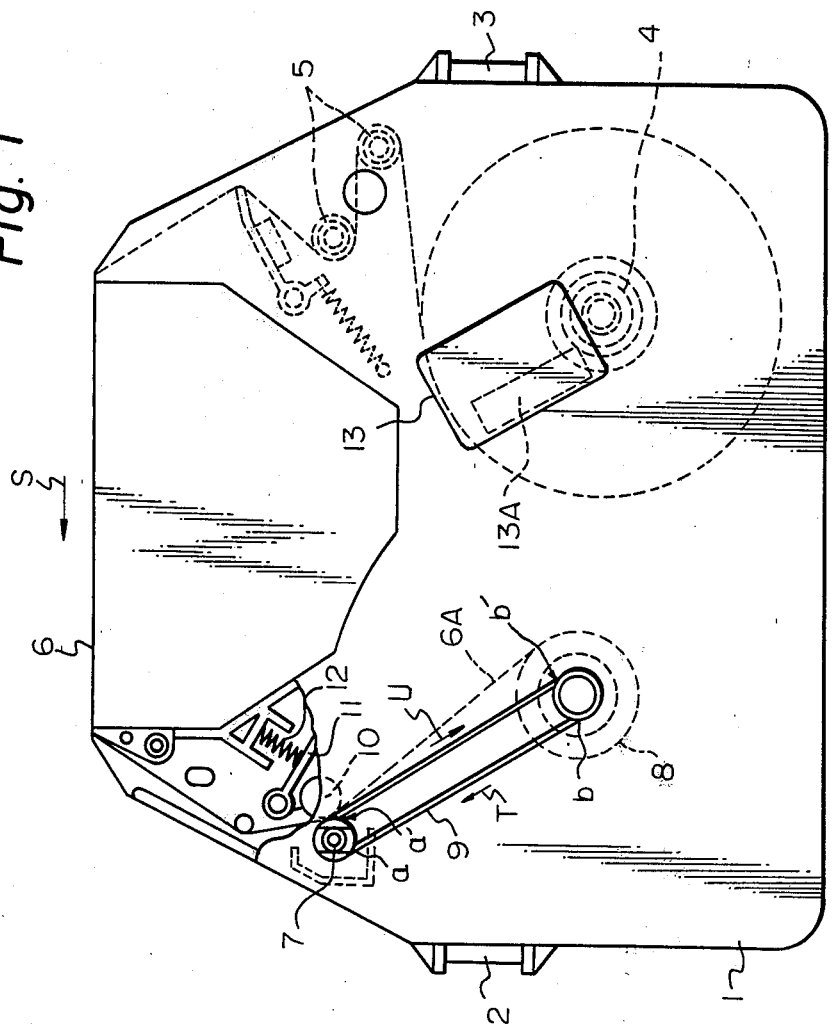
FIG. 1 is a partly cut away plan view of a conventional film ribbon cartridge.

Referring to FIG. 1, there is shown in partly cut away top plan view a conventionally used film ribbon cartridge. The reference numeral 1 denotes the casing of the cartridge which has locking portions 2 and 3 at opposite sides thereof. A core section 4 inside the casing 1 holds the unused part of a film ribbon designated 6 and 6A in the drawing. Denoted by the reference numeral 5 is a pair of rollers over which the film ribbon 6 from the core section 4 is passed. Also shown in the drawing are a feed gear 7, a take-up spindle 8, an endless belt 9, a driven gear 10 held in pressing contact with the feed gear 7, a tension lever 11, a spring 12 and a back tension member 13 having a friction engagement portion 13A. The film ribbon 6 moves in the direction indicated by an arrow S while the belt 9 runs as indicated by arrows T and U.

The feed gear 7 and take-up spindle 8 are driven for rotation by a stepping motor (not shown) to feed the film ribbon 6 from the core section 4 in the direction S and successively wind it on the take-up spindle 8. The friction engagement portion 13A of the back tension member 13 is held in contact with the core section 4 from above such that a back tension acts against the movement of the film ribbon 6 in the direction S due to frictional resistance.

The back tension is imparted to the film ribbon 6 during ribbon feed which occurs intermittently in accordance with the printing action. Another function of the back tension is to avoid disturbance of the wound state of the ribbon 6 in the core section 4.

The feed gear 7 and take-up spindle 8 on the take-up side of the cartridge have different diameters. The endless belt 9 passed over these elements 7 and 8 is made of an elastic material such as rubber.

With this arrangement, the film ribbon 6, 6A is subjected to a constant tension when taken up and accordingly it can be tightly wound up on the spindle 8. During the take-up operation, one run a-b of the belt 9 remains under tension and the other run a'-b' is in a slackened state.

At the instant the ribbon feed action is stopped, a force acts on the belt 9 to establish a common distribution of tension through the two runs a-b and a'-b'. Then the feed gear 7 is caused to rotate in the opposite direction to the usual take-up direction indicated by arrows T and U whereby the stop position of the stepping motor is displaced in the reverse direction.

Such reverse displacement of the stop position will be discussed in detail in connection with torque curves of a stepping motor.

Figure 2:
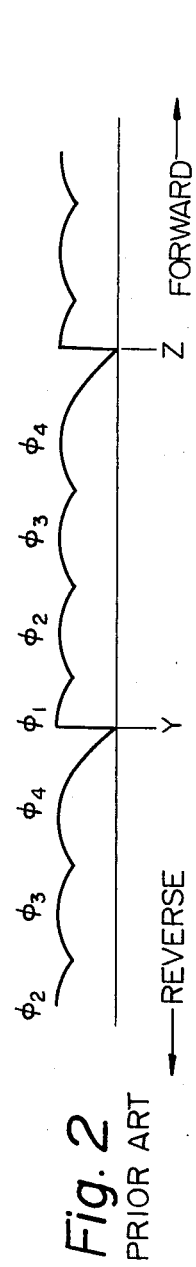
FIG. 2 shows a torque curve of a stepping motor in prior art operation.

A torque curve of a stepping motor in usual operation is shown in FIG. 2. In this case, phase $\phi 4$ is assumed to be the stop phase and points Y and Z are supposed to be the stop positions. The torque curve indicates that the stepping motor is stopped at point Y after successive energization or selection of phases $\phi 1$-$\phi 4$ by the previous drive action, driven through similar phases $\phi 1$-$\phi 4$ by four ribbon feed clock pulses, and stopped at point Z.

As already stated, it is a general practice to carry out drive/hold selection at stop points Y and Z in order to avoid heat generation in the motor, its associated circuitry etc. and enhance the reliability of the motor operation.

Figure 3:
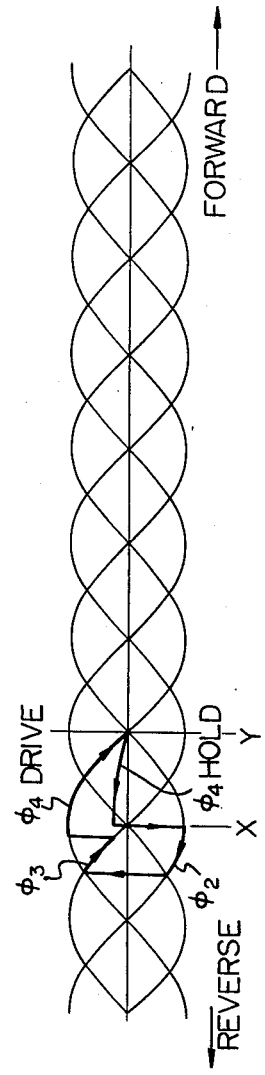
FIG. 3 shows a torque curve of a stepping motor provided by drive/hold selection.
Figure 4:
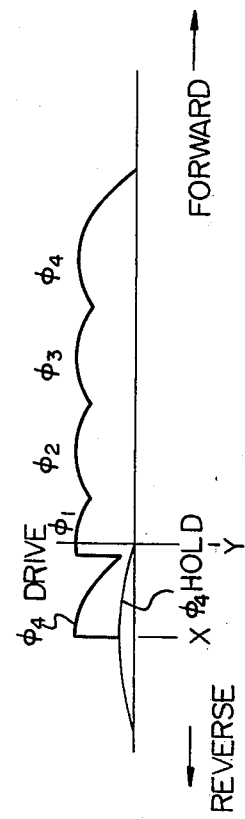
FIG. 4 shows a torque curve obtainable with a stepping motor driven by a system of the present invention.

FIG. 3 shows a torque curve of the stepping motor which results from the drive/hold selection. As shown, the operating phase of the stepping motor in a stop position at point Y for example is changed from phase $\phi 4_{DRIVE}$ to phase $\phi 4_{HOLD}$, thereby holding the motor shaft with a relatively small torque.

It is during such detention of the stepping motor with a relatively small torque that a reverse torque is applied thereto from a load such as the ribbon cartridge as mentioned. The reverse torque drives the motor back to the left toward point X.

Suppose that the reverse torque and the holding torque of phase $\phi 4_{HOLD}$ have reached equilibrium at point X and the stepping motor has stopped at this point.

When a usual drive action occurs to switch the phase from the hold phase $\phi 4_{HOLD}$ to a drive phase $\phi 1$, the torque of the phase $\phi 1$ at point X is zero as shown in FIG. 3. Thus, the stepping motor does not rotate at all or, if rotated a little in any direction, cannot produce a torque large enough for its rotation and in effect can hardly rotate.

When the drive phase is shifted from $\phi 1$ to $\phi 2$, the stepping motor starts rotating in the reverse direction. Upon shift to drive phase $\phi 3$, the stepping motor now rotates in the forward direction and continues this rotation through phase $\phi 4$.

The torque at these phases $\phi 1$-$\phi 4$ is indicated by a bold arrow line in FIG. 3. It will be seen that the stop position of the stepping motor after drive through the phases $\phi 1$-$\phi 4$ is again point Y.

Even when the stop position of the stepping motor is between points X and Y, the stop position after drive will also be point Y as in the previous case unless the first drive phase $\phi 1$ has driven the stepping motor in the forward direction to the right beyond point Y.

A ribbon feed control employing a conventional drive system is thus incapable of positively generating a proper magnitude of start-up torque for the next drive because of the dislocation of the stop position of the motor attributable to the force which tends to rotate it in the reverse direction. The result is various troubles such as an irregular density distribution and ommission of characters.

A stepping motor drive system according to the present invention eliminates such troubles and facilitates accurate drive in all cases even if the reverse torque from the load has displaced the stop position in the reverse direction, by allowing a small holding torque to develop based on the $\phi 4_{HOLD}$ phase under detention as in the conventional drive system.

A characteristic feature of the present invention resides in that, when the stepping motor is in a stop condition at a position displaced from the position Y back to the position X, the immediate change from the hold phase to the drive phase does not occur. That is, as already described, the system of the invention first switches the phase of the transient stop position, which is $\phi 4$, from the hold torque $\phi 4_{HOLD}$ to the drive torque $\phi 4_{DRIVE}$ and then sequentially switches the phases $\phi 1$-$\phi 4$ such that desired rotation of the motor takes place.

With this principle, the torque in the stop phase is changed from hold to drive at the start of rotation whereby the motor stopped at point X by the reverse torque is brought back to the regular stop position Y and then caused to rotate in the normal manner by a start-up torque which develops thereafter.

Figure 5:
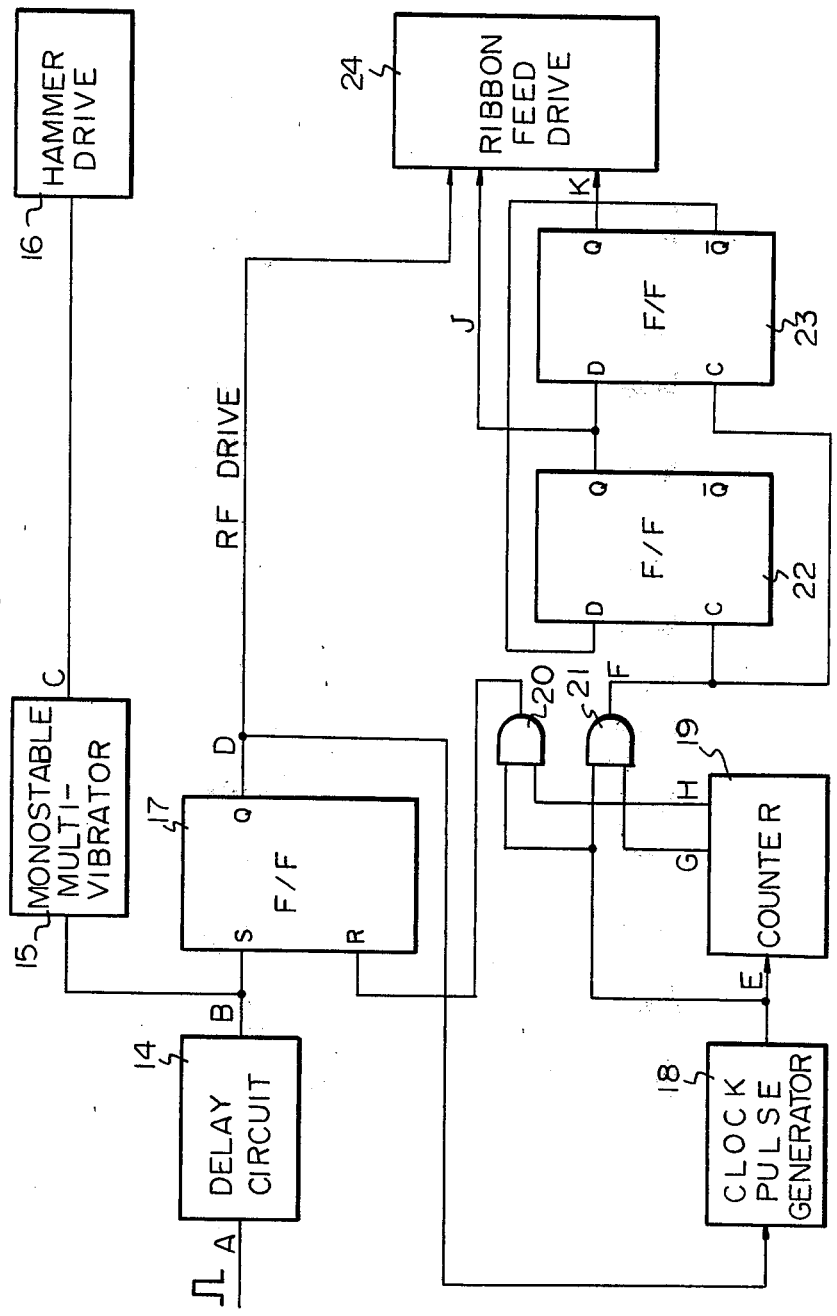
FIG. 5 is a block diagram showing a prior art ribbon feed control circuit.

Referring to FIG. 5, there is illustrated in block diagram form a prior art circuit for the control of ribbon feed. The control circuit comprises a delay circuit 14, a monostable multivibrator 15 for a hammer, a hammer driver 16, a set-reset flip-flop circuit 17, a clock pulse generation circuit 18, a counter 19, AND gate circuits 20 and 21, delay flip-flop circuits 22 and 23 and a ribbon feed driver 24.

Figure 6:
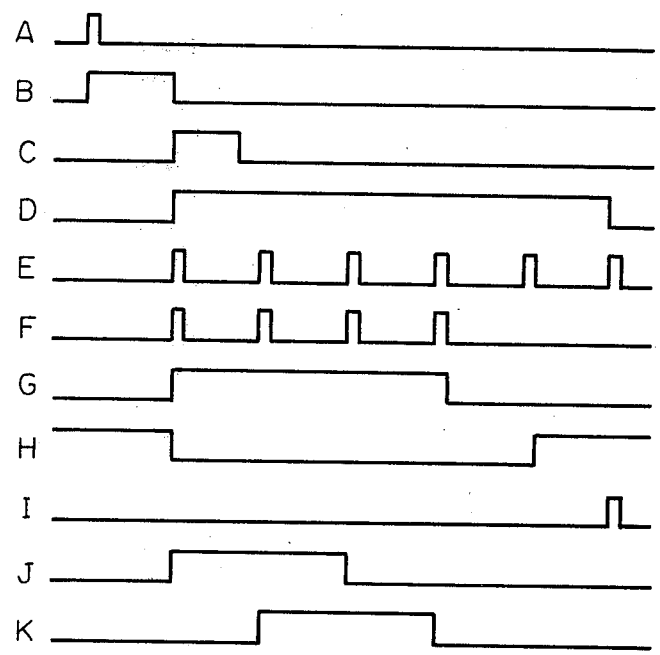
FIG. 6 is a timing chart demonstrating the operation of the circuit of FIG. 5.

FIG. 6 is a timing chart showing the operation of the control circuit of FIG. 5. The reference characters A-K designating the individual signals correspond to those shown in the circuitry of FIG. 5.

When selection of a type element or movement of a carriage is completed in accordance with the operation of the printer, a control section not shown supplies a pulse A to the hammer and ribbon feed control circuit.

The pulse A is fed to the delay circuit 14 which then causes hammering and ribbon feeding actions to start after a preset time delay B. This time delay B is intended to ensure a time period for the apparatus to reach a full mechanical stop after the type selection or carriage movement.

At the trailing edge of the time delay pulse B, the monostable multivibrator 15, set-reset flip-flop 17 and clock pulse generator 18 are activated.

The monostable multivibrator 15 feeds a hammer drive pulse output C to the hammer driver 16 causing a hammer (not shown) to perform a printing action. The flip-flop circuit 17 on the other hand supplies the ribbon feed driver 24 with a ribbon feed drive signal D while the clock pulse generator 18 produces clock pulses E.

Four ribbon feed clock pulses E drive the motor to the next stop position. The counter 19 counts the four ribbon feed clock pulses E and, while counting, produces an output signal G which keeps the AND gate 21 enabled. Accordingly, an output F of the gate 21 is passed to the delay flip-flops 22 and 23 and causes them to feed phase energization signals J and K for ribbon feed to the ribbon feed driver 24.

In this prior art control circuit of FIG. 5, it will be seen from FIG. 6 that the phase switching signal J appears simultaneously with the drive signal D and causes a drive current to immediately energize the next phase at the start of operation of the motor.

Thus, as discussed in detail in connection with FIG. 3, where the stop position of the motor is displaced in the reverse direction by the reverse torque, a predetermined start-up torque is unobtainable at the start resulting in inaccurate rotation. This renders the ribbon feed actions inaccurate and brings about various troubles such as irregular densities and omission of characters reproduced on a printing surface.

It will be noted that the two clock pulses E appearing after the output F of the AND gate 21 has disappeared are used to make up for resistance in the ribbon feed action.

Figure 7:
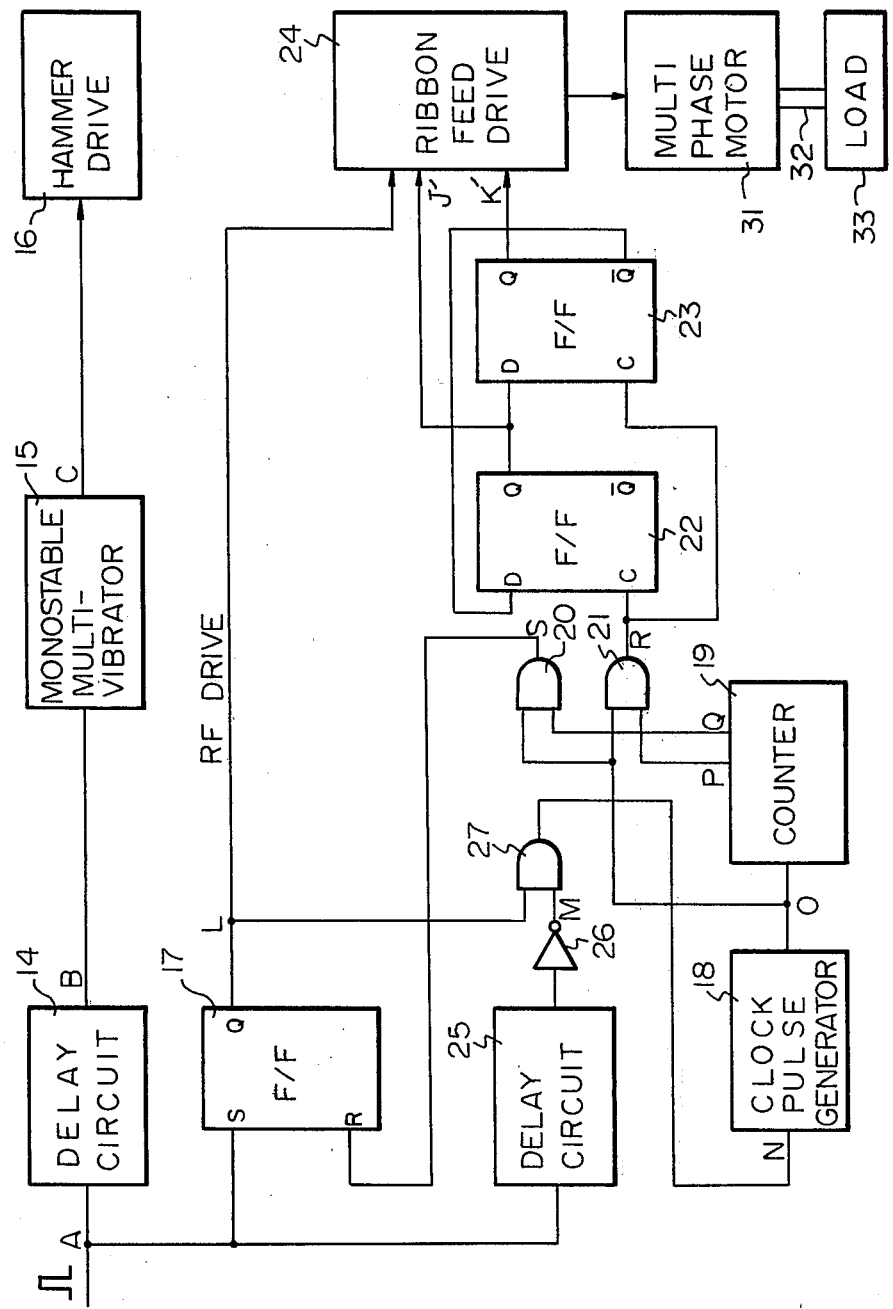
FIG. 7 shows in block diagram form a ribbon feed control circuit for practicing the system of the present invention.
Figure 8:
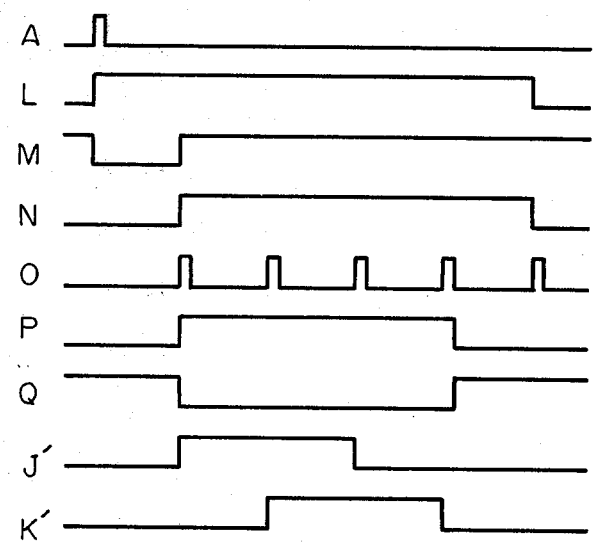
FIG. 8 is a timing chart explanatory of the operation of the control circuit shown in FIG. 7.

FIG. 7 is a block diagram showing an example of a ribbon feed control circuit applicable to the present invention. The control circuit comprises a delay circuit 25, an inverter 26 and an AND gate circuit 27 in addition to the components 14–24 shown in FIG. 5.

Further illustrated is a multi phase motor 31 driven by the circuit 24. The motor 31 has a shaft 32 which drives a load 33 such as the film ribbon which exerts a reverse torque on the shaft 32.

The control circuit of FIG. 7 controls the hammer drive in essentially the same way as the conventional control circuit depicted in FIG. 5.

Meanwhile, for the ribbon feed control, the control circuit immediately generates a ribbon feed drive signal L because the input pulse A is fed directly to the flip-flop 17. The motor stop phase for ribbon feed which has been energized by the hold current is immediately energized with the current so that the motor shaft 32 returns from the displaced stop position attributable to the reverse torque back to the proper stop position.

Since the drive system of the present invention generates a drive current at the stop phase in response to the input pulse A, it compensates for the positional error before start and thereby allows a proper start-up torque to be generated at the start of drive.

In FIG. 7, the time delay M preset in the delay circuit 25 is common to the time delay B of the delay circuit 14 and the subsequent phase alteration occurs in the same way as in FIGS. 5 and 6.

After the time delay M, the AND gate 27 is enabled to supply the clock pulse generator 18 with a signal N which corresponds to the driven signal D of the conventional control circuit.

The signal output N of the AND gate 27 triggers the clock pulse generator 18 and four output pulses O of the clock pulse generator 18 are counted by the counter 19. These four clock pulses O drive the motor shaft 32 to the next stop position.

The phase energization signals J' and K' appear at the same timing as the conventional signals J and K.

Because the resistance in the ribbon feed action can be compensated for by one clock pulse according to the invention, the output signal N of the AND gate 27 goes low at the leading edge of the fifth clock pulse O which appears after the AND gate 21 has been inhibited by the output P of the counter 19.

In summary, a stepping motor drive apparatus according to the present invention drives a stepping motor from its stopped state by energizing the stop phase with a drive current and then energizing the next phase with the drive current.

With this principle, the drive system of the invention can drive a stepping motor for accurate rotation even though a reverse torque is exerted by a load driven by the stepping motor in a stop position. This promotes positive drive of a film ribbon without irregular density distribution and omission of characters and like troubles attributable to inaccurate rotation of the motor.

Various modifications will become possible for those skilled in the art after receiving the teachings of the present disclosure without departing from the scope thereof.

What is claimed is:

1. A motor drive apparatus comprising a multi phase motor having a shaft and drive means for sequentially energizing the motor phases with a high drive current for rotating the shaft and for energizing a present motor phase with a low hold current for holding the shaft in a respective present position, characterized in that, prior to energizing a next motor phase for rotating the shaft away from the present position, the drive means is constructed to energize the present phase with the high drive current for a predetermined length of time.

2. An apparatus as in claim 1, further comprising a load which is driven by the shaft and exerts a reverse torque on the shaft.

* * * * *